(12) United States Patent
Steinkraus et al.

(10) Patent No.: US 11,712,021 B1
(45) Date of Patent: Aug. 1, 2023

(54) ADJUSTABLE PET TREAT LAUNCHING DEVICE

(71) Applicant: Gramercy Products, Inc., Secaucus, NJ (US)

(72) Inventors: William Steinkraus, Fort Lee, NJ (US); Daniel Troiano, Secaucus, NJ (US)

(73) Assignee: Gramercy Products, LLC, Secaucus, NJ (US)

( * ) Notice: Subject to any disclaimer, the term of this patent is extended or adjusted under 35 U.S.C. 154(b) by 0 days.

(21) Appl. No.: 17/490,307

(22) Filed: Sep. 30, 2021

Related U.S. Application Data

(60) Provisional application No. 63/086,128, filed on Oct. 1, 2020.

(51) Int. Cl.
*A01K 5/00* (2006.01)

(52) U.S. Cl.
CPC ........................................ *A01K 5/00* (2013.01)

(58) Field of Classification Search
CPC ... A01K 5/00; F41B 7/00; F41B 7/003; F41B 7/006; F41B 7/08; F41A 19/10
USPC ................................ 119/707; 124/16, 26, 27
See application file for complete search history.

(56) References Cited

U.S. PATENT DOCUMENTS

| | | | | |
|---|---|---|---|---|
| 212,826 | A | * | 3/1879 | Weaver ................... F41B 7/006 124/27 |
| 468,089 | A | * | 2/1892 | Pratt ......................... F41B 7/00 D21/574 |
| 583,175 | A | | 5/1897 | Harold |
| 756,988 | A | | 4/1904 | Smith |
| 806,897 | A | | 12/1905 | Kautzky |
| 824,506 | A | | 6/1906 | Obiols |
| 1,222,446 | A | | 4/1917 | Napier |
| 1,270,535 | A | * | 6/1918 | Madison ................. F41B 7/006 124/27 |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Brady W Frazier
*Assistant Examiner* — Zoe Tam Tran
(74) *Attorney, Agent, or Firm* — Thomas A. O'Rourke; Bodner & O'Rourke, LLP

(57) ABSTRACT

A pet treat launching device includes: a launcher assembly and cover assembly. The launcher assembly includes: a housing, trigger, first spring, treat launch member, and second spring. The trigger moves in a housing track between first and second positions, being biased towards the first trigger position by the first spring. The treat launch member is coupled to the housing to slide between a launch position and a release position, and is biased by the second spring towards an open end of the housing, i.e., towards the launch position. The cover assembly, which includes a treat storage member that slidably receives a stacked plurality of pet treats, is configured to slidably couple to the launcher assembly at each of a plurality of different housing coupling positions, to accommodate launch of a corresponding plurality of different treat thicknesses. The trigger selectively engages and disengages with the second spring to accomplish treat launching.

14 Claims, 16 Drawing Sheets

(56) References Cited

U.S. PATENT DOCUMENTS

| | | | |
|---|---|---|---|
| 1,758,032 A | 5/1930 | Dickman | |
| 2,135,603 A | 11/1938 | Roth | |
| 2,287,636 A | 6/1942 | Hayter | |
| 2,318,139 A | 5/1943 | Calabrese | |
| 2,321,077 A * | 6/1943 | Gora | F41B 7/003 124/16 |
| 2,650,593 A | 9/1953 | Weil | |
| 3,487,824 A * | 1/1970 | Profitt | F41B 7/006 124/52 |
| 3,509,863 A | 5/1970 | Barker | |
| 3,515,114 A | 6/1970 | Carbonneau | |
| 3,717,136 A | 2/1973 | Gay | |
| 3,857,379 A | 12/1974 | Burghardt | |
| 4,014,307 A | 3/1977 | Horvath | |
| 4,059,089 A | 11/1977 | Lehman | |
| 4,169,453 A | 10/1979 | Hunsicker | |
| 4,241,716 A | 12/1980 | Tsui | |
| 4,277,068 A * | 7/1981 | Sasaki | F41B 7/08 473/511 |
| 4,367,723 A | 1/1983 | Resuggan | |
| 4,703,744 A | 11/1987 | Taylor | |
| 4,709,685 A | 12/1987 | Kholin | |
| 4,870,945 A | 10/1989 | Hutchison | |
| 5,050,575 A | 9/1991 | Killion | |
| 5,199,410 A | 4/1993 | Cheng | |
| 5,232,226 A | 8/1993 | Glickson | |
| 5,243,955 A | 9/1993 | Farless | |
| 5,253,873 A | 10/1993 | Grattan | |
| 5,355,866 A | 10/1994 | Hunter | |
| 5,471,967 A | 12/1995 | Matsuxaki | |
| 5,531,209 A | 7/1996 | Liedtke | |
| 5,579,749 A | 12/1996 | Wilkinson | |
| 5,611,321 A | 3/1997 | Hoeting | |
| 5,613,482 A | 3/1997 | Thai | |
| 5,782,228 A | 7/1998 | Wu | |
| 5,791,326 A | 8/1998 | Brown | |
| 5,979,424 A | 11/1999 | Alvarez | |
| 5,988,152 A | 11/1999 | Halter | |
| 5,996,564 A | 12/1999 | Kotowski | |
| 6,116,229 A | 9/2000 | Wu | |
| 6,119,671 A | 9/2000 | Smith | |
| 6,273,078 B1 | 8/2001 | Schwesinger | |
| 6,523,535 B2 | 2/2003 | Rehkemper | |
| 6,733,356 B2 * | 5/2004 | Lee | A63H 27/14 124/31 |
| 6,758,203 B1 | 7/2004 | Wu | |
| 6,884,186 B2 | 4/2005 | Fuckiger | |
| 7,051,727 B2 | 5/2006 | Wu | |
| 7,448,371 B2 | 11/2008 | Sapir | |
| 7,552,557 B1 * | 6/2009 | Mabry | F41A 11/04 42/71.01 |
| 7,905,222 B1 | 3/2011 | Fenley | |
| 7,926,474 B2 | 4/2011 | Berry | |
| 7,938,110 B2 | 5/2011 | Udwin | |
| 8,245,702 B2 | 8/2012 | Lendvay | |
| 8,393,299 B1 | 3/2013 | Bernat | |
| 8,485,170 B2 | 7/2013 | Prior | |
| 8,671,926 B1 | 3/2014 | Mahlstedt | |
| 8,720,426 B2 | 5/2014 | Hadley | |
| 8,784,152 B2 | 7/2014 | Busse | |
| 8,955,503 B2 * | 2/2015 | Corsiglia | A63B 69/406 124/78 |
| 8,967,130 B2 | 3/2015 | Victor | |
| 8,978,633 B2 | 3/2015 | Hedeen | |
| 8,997,727 B1 | 4/2015 | Hamel | |
| 9,004,052 B1 | 4/2015 | Poirier | |
| 9,097,484 B2 | 8/2015 | Poirier | |
| 9,194,646 B2 | 11/2015 | Victor | |
| 9,303,942 B2 | 4/2016 | Sievers | |
| 9,352,244 B2 | 5/2016 | Aguila | |
| 9,513,075 B2 | 12/2016 | Lallier | |
| 9,683,807 B2 | 6/2017 | Arnold | |
| 9,719,749 B1 | 8/2017 | Prior | |
| 2014/0259845 A1 * | 9/2014 | Johnson | F41A 19/09 42/69.01 |

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.

"Engineering Fit," available at: https://en.wikipedia.org/wiki/Engineering_fit, Jul. 8, 2019.

* cited by examiner

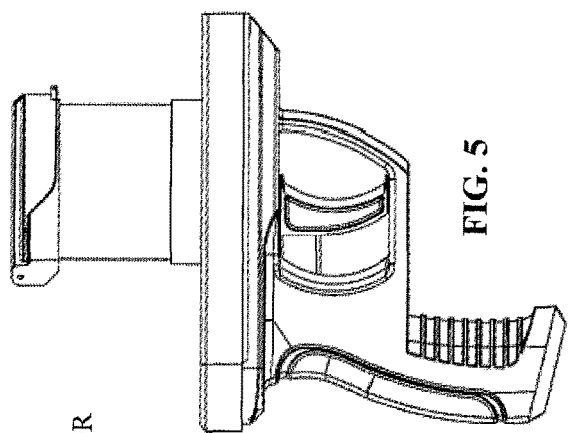
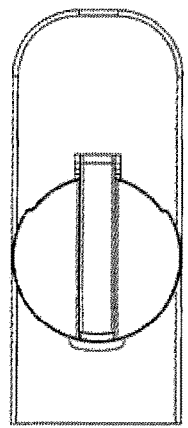
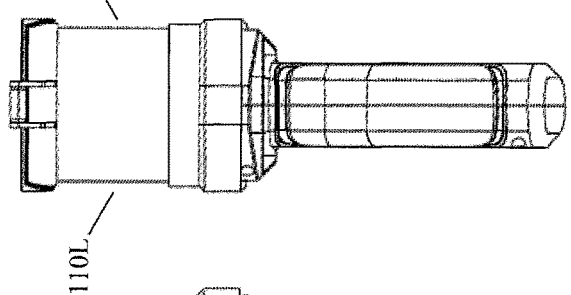
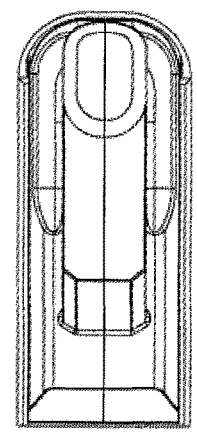
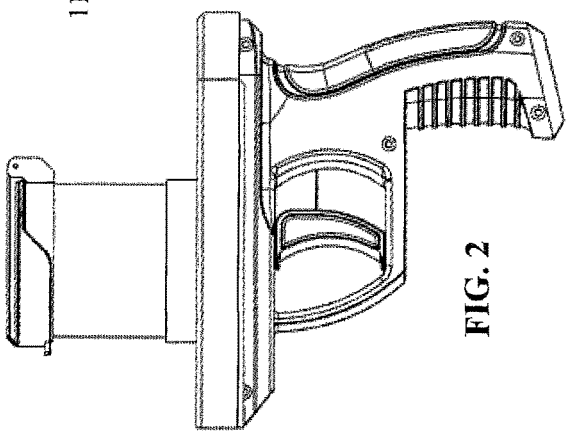
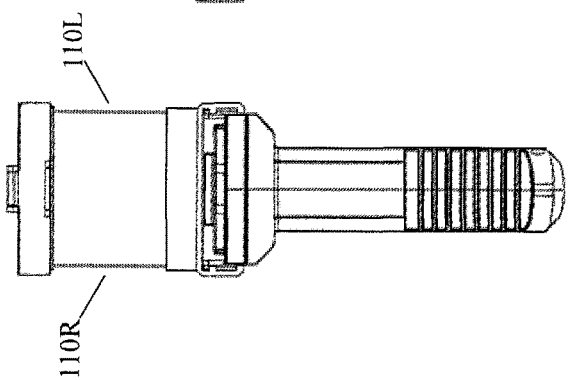

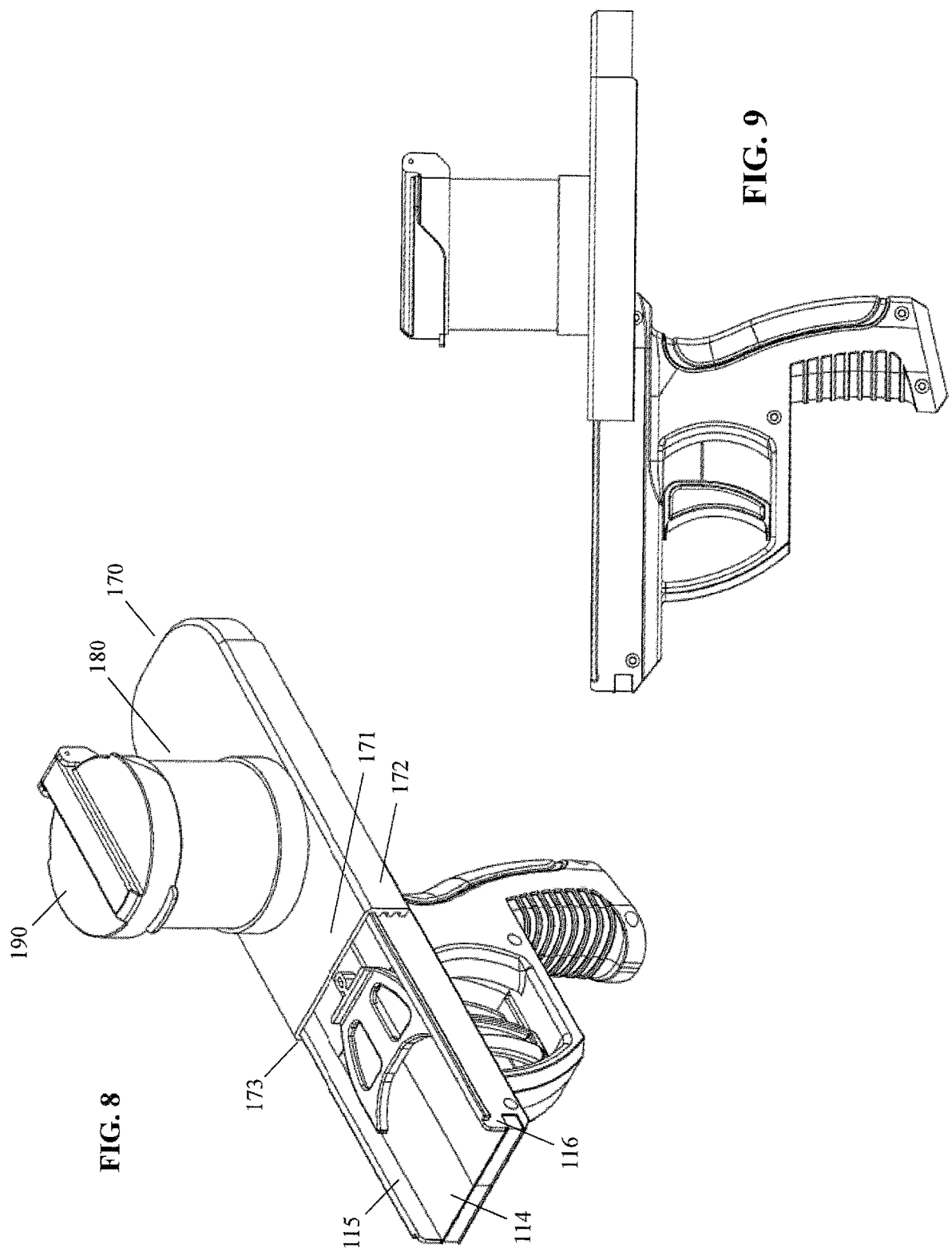

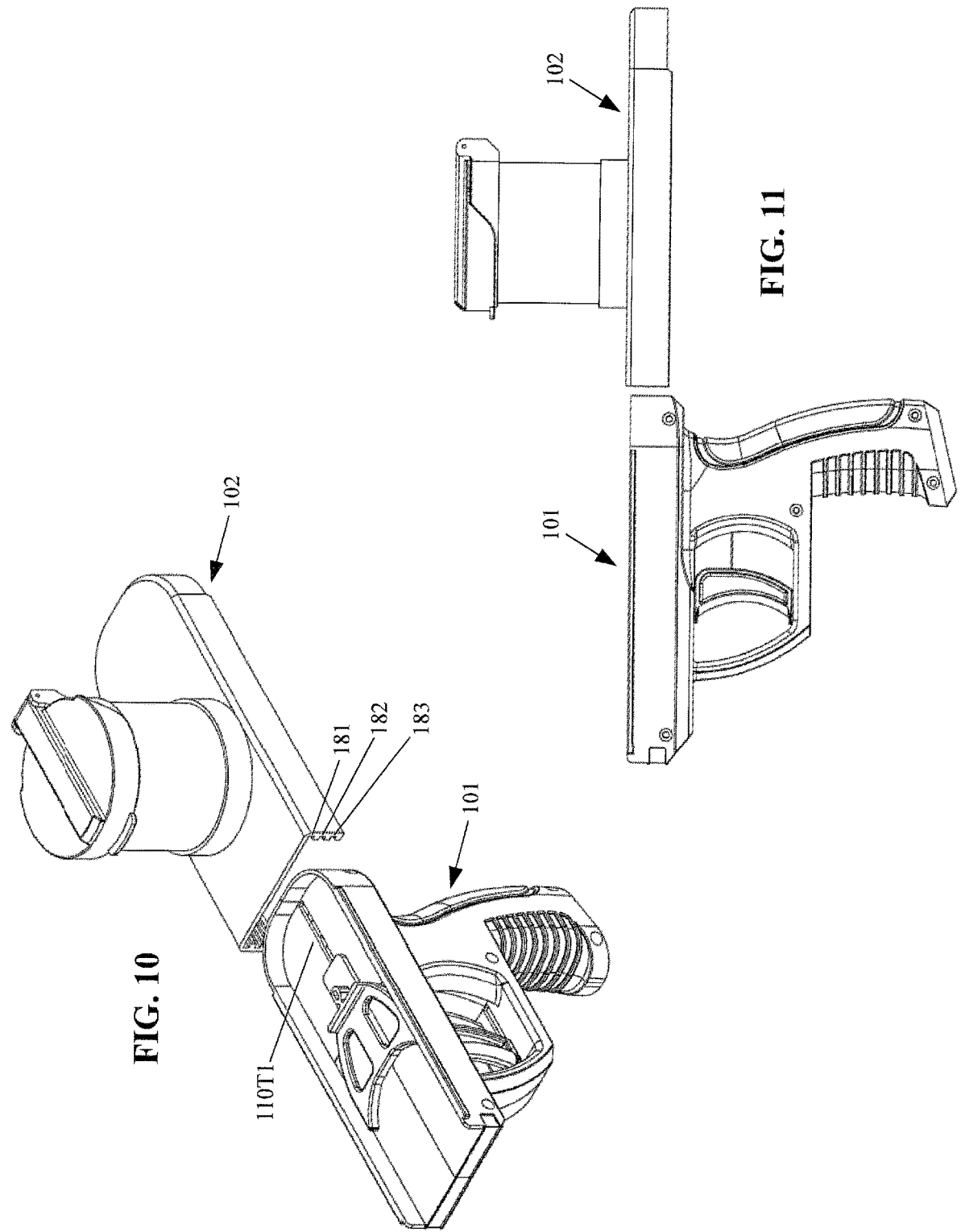

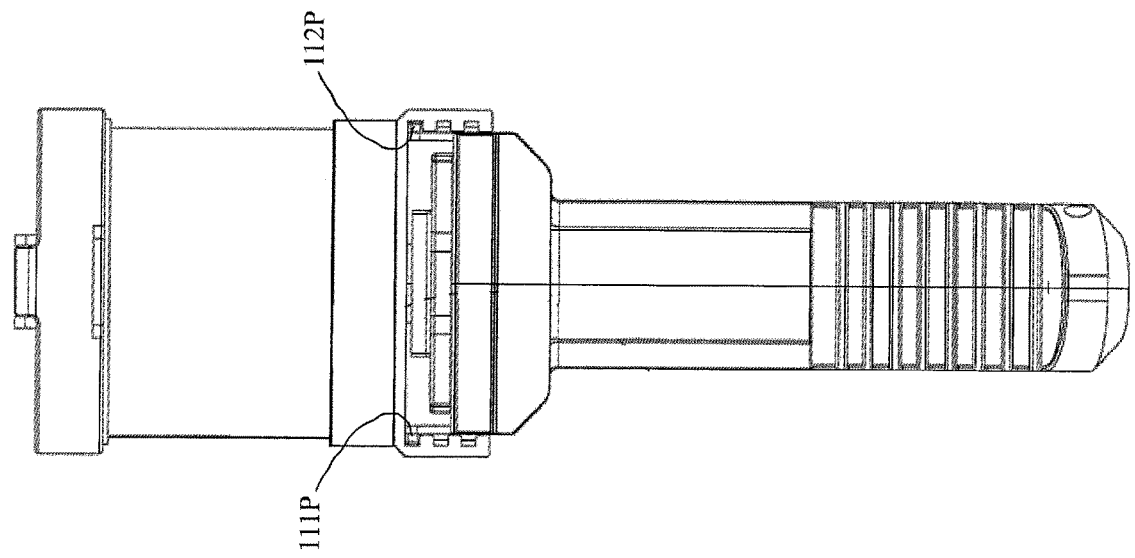
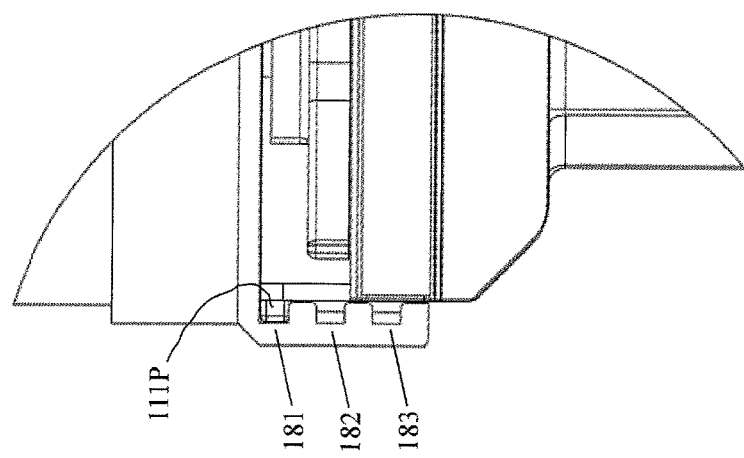

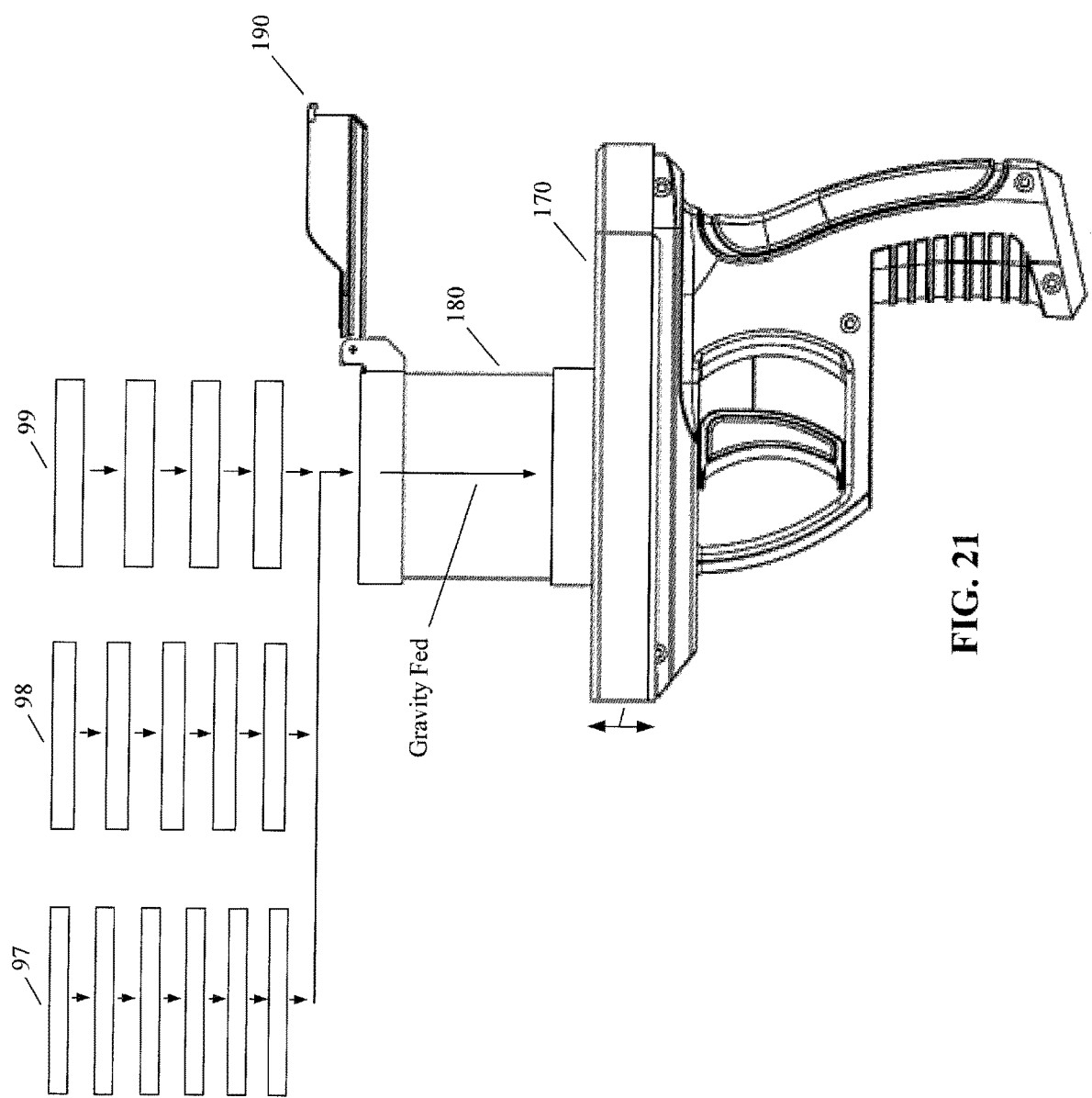

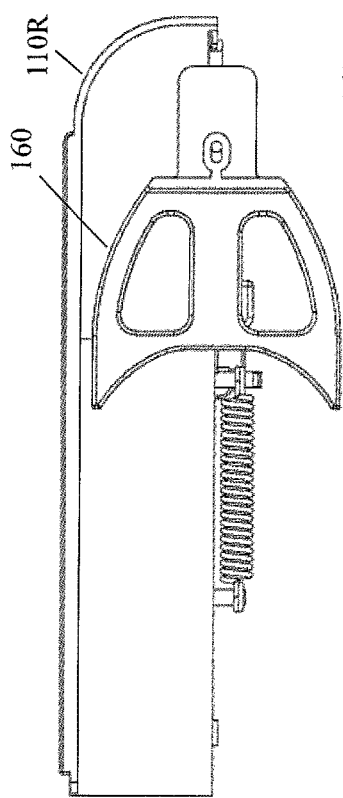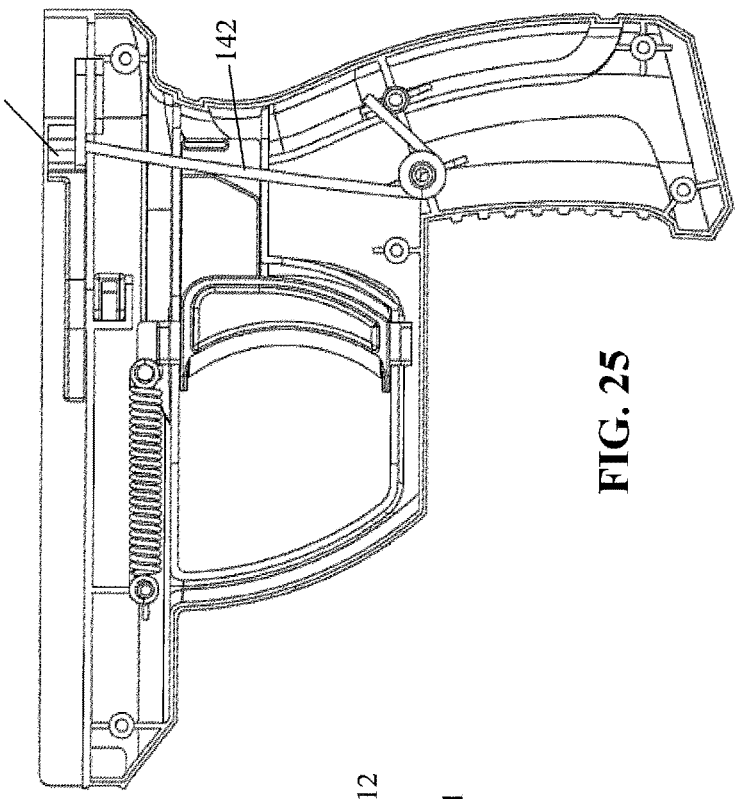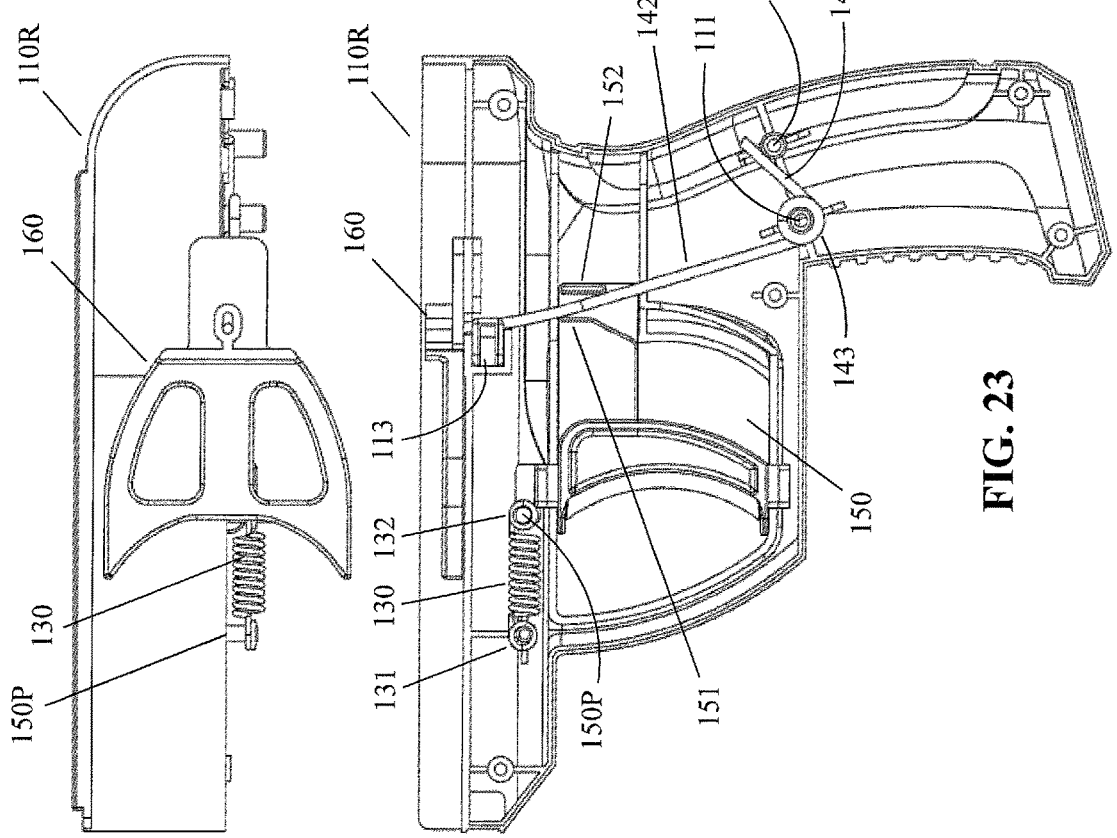

ADJUSTABLE PET TREAT LAUNCHING DEVICE

CROSS REFERENCES TO RELATED APPLICATIONS

This application claims priority on U.S. Provisional Application Ser. No. 63/086,128, filed on Oct. 1, 2020, the disclosures of which are incorporated herein by reference.

FIELD OF THE INVENTION

The subject technology relates generally to devices for launching objects, and more particularly to a device for launching a plurality of various different sized pet treats.

BACKGROUND OF THE INVENTION

There are numerous different ways that inventors and pet owners have devised for dispensing pet treats. For example, U.S. Pat. No. 6,983,722 to Tepper is for a pet treat dispensing system in which a non-edible interactive toy animal is configured to visibly retain a pet treat for easy access by a pet that discovers it. Also, U.S. Pat. No. 7,143,719 to Giddens is for a pet treat dispenser in the form of a canister with a dispenser slidably mounted in the canister that can be actuated by the pet owner to dispense treats, and includes a clicker to attract the pet's attention. U.S. Pat. No. 8,453,609 to McCann is for a Pet Toy having a Treat Dispenser that the pet must toss into the air to gain access to the treat, thereby encouraging the animal to exercise. U.S. Pat. No. 8,904,967 to Reiss is for a pet treat dispenser that requires the animal to move the dispenser in order for it to dispense the treats.

The treat dispenser disclosed herein provides the pet owner with the ability to direct the animal's activity, being in the form of a pet treat launching device the projects a disk-shaped treat in any direction desired by the pet owner. Also, the pet treat dispenser disclosed herein is adjustable, in that it may be quickly adjusted to be able to launch any one of three different sized (thickness) pet treats.

It is noted that citing any reference within this disclosure, i.e., any patents, published patent applications, and non-patent literature, is not an admission regarding a determination as to its availability as prior art with respect to the herein disclosed and claimed apparatus.

OBJECTS OF THE INVENTION

It is an object of the invention to provide an apparatus for dispensing treats to pets.

It is another object of the invention to provide an apparatus that projects treats in the air to cause the pet to run and chase after the treat, thereby exercising in the process of obtaining the treat.

It is a further object of the invention to provide an apparatus that launches pet treats that a pet must chase to obtain the reward.

It is another object of the invention to provide a treat launching device that is capable of storing and launching a plurality of treats.

It is also an object of the invention to provide a pet treat launching device that is capable of launching pet treats having different thicknesses.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the disclosed apparatus, a pet treat launching device may broadly include: a launcher assembly, and a cover assembly. The launcher assembly may include: a housing, a trigger, a first spring, a treat launch member, and a second spring. The elongated housing has a first end and a second end, and a portion of the housing may be formed into a channel section to support the treat prior to and during its launch, with the channel section being open at least at one end. The other end may desirably be closed. The trigger is configured to move with respect to the housing between at least a first trigger position and a second trigger position, and the first spring is configured to bias the trigger towards the first trigger position. The treat launch member is slidably mounted to the housing, being slidable between at least a launch position, a cocked position, and a release position, and the second spring is configured to bias the treat launch member to slide towards the open end of the channel section of the housing, i.e., towards the launch position. The cover assembly includes: a cover member; and a treat storage member. The treat storage member is configured to slidably receive a stacked plurality of pet treats. The cover assembly is configured to slidably couple to the launcher assembly at each of a plurality of different housing coupling positions, to accommodate launch of a corresponding plurality of different treat thicknesses. The coupling may be accomplished using any suitable arrangement, and in one embodiment, it may be through the use of one or more slots on one of the assemblies (e.g., a pair of slots), and one or more protrusions on the other assembly member (i.e., a plurality of pairs of protrusions), where each protrusion may be slidably received in a particular slot to accommodate a particular pet treat thickness. Alternatively, in another embodiment, the coupling may be through accomplished using a plurality of pairs of slots on one of the assemblies (e.g., the cover assembly), and a pair of protrusions on the other assembly member (i.e., the launcher assembly), where the pair of protrusions may be slidably received in each of the pair of slots to accommodate a particular pet treat thickness (e.g., a first treat thickness, a second treat thickness, and a third pet treat thickness, where three pairs of slots are utilized).

The pet treat launching device may also be particularly configured in its operation. The trigger is configured to releasably engage with the second spring when the trigger is biased into the first trigger position, which first trigger position may correspond to the launch position of the treat launch member. The arrangement is configured such that the second spring disengages from the trigger after the trigger is actuated into the second trigger position, at which point it has correspondingly driven the treat launch member into the release position, which disengagement then causes the biased treat launch member to accelerate toward the launch position to launch the one pet treat that has dropped down to rest upon the top of the channel section of the housing. The cover and housing are formed such that the pet treat fits between the top of the channel section of the housing and the corresponding channel section of the cover member, which form a launch chamber that is slightly oversized with respect to the thickness of the pet treat to be launched. The disengagement of the second spring from the trigger may be through the use of a particularly shaped track that may be formed in a portion of the housing, and in which track the trigger may slide and thereby be directed. The track may have a first portion that is straight (i.e., linear) and which is oriented substantially parallel to the axial direction of the channel section. The track may also have a second portion that is formed at an acute angle with respect to the axial direction of the channel section. A radiused track portion may serve to transition the first track portion into the second track portion. Therefore, when the trigger is actuated to move away from the first trigger position and remains within the first portion of the track, the trigger remains engaged with the second spring, and the connection of the second spring with the launcher causes the treat launch member to correspondingly move. As the trigger moves into the second portion of the track, its angular positioning with respect to the housing causes the second spring to disengage from the trigger (i.e., as the treat launch member reaches the release position), and the second spring being unrestricted by the trigger thereafter biases and accelerates the treat launch member towards the first end of the housing (i.e., towards the treat launch position). The accelerated movement of the treat launch member is terminated upon reaching a housing stop, and the moving pet treat exits out the open end of the treat launch chamber, in the direction that the pet treat launching device was aimed.

The pet treat launching device may be configured to launch any particular shaped pet treat (e.g., rectangular, square, octagonal, etc.), and may be adapted to launch cylindrical pet treats of a given thickness, in which case the pet treat storage member may be formed of a hollow cylindrical member that interconnects with the treat launch chamber. Different spring types may be used for each of the first and second springs, and merely to be exemplary, in one embodiment, the first spring may be a helical spring, and the second spring may be a torsion spring.

BRIEF DESCRIPTION OF THE DRAWINGS

The description of the various example embodiments is explained in conjunction with appended drawings, in which:

FIG. 2 is a first side view of the pet treat launching device of FIG. 1;

FIG. 3 is a front view of the pet treat launching device of FIG. 1;

FIG. 4 is a rear view of the pet treat launching device of FIG. 1;

FIG. 5 is a second side view of the pet treat launching device of FIG. 1;

FIG. 6 is a top view of the pet treat launching device of FIG. 1;

FIG. 7 is a bottom view of the pet treat launching device of FIG. 1.

FIG. 8 is the perspective view of FIG. 1, but shown with the cover assembly being partially slid away from its engaged position with respect to the housing of the launcher assembly;

FIG. 9 is the side view of the arrangement shown in FIG. 8;

FIG. 10 is the perspective view of FIG. 1, but shown after the cover assembly has been removed from the launcher assembly;

FIG. 11 is the side view of the arrangement shown in FIG. 10;

FIG. 18 is the front view of FIG. 3 shown enlarged, and also shown with the flanges of the housing received in the upper track of the cover member to facilitate launching of the thinnest pet treat disks;

FIG. 18A is an enlarged detail view of the upper track of the cover member and the housing flanges, as shown in FIG. 18;

FIG. 21 is the side view of FIG. 2 shown with the pivotable cover of the treat storage cylinder in the open position, and three stacks of different sized treat disks prior to one of the stacks being loaded therein;

FIG. 23 is a side view of the pet treat launching device as seen in FIG. 22;

FIG. 24 is top view of the pet treat launching device as seen in FIG. 23;

FIG. 25 is a side view of the pet treat launching device as shown in FIG. 22A;

FIG. 26 is a top view of the pet treat launching device as shown in FIG. 25;

DETAILED DESCRIPTION OF THE INVENTION

Figure 1:
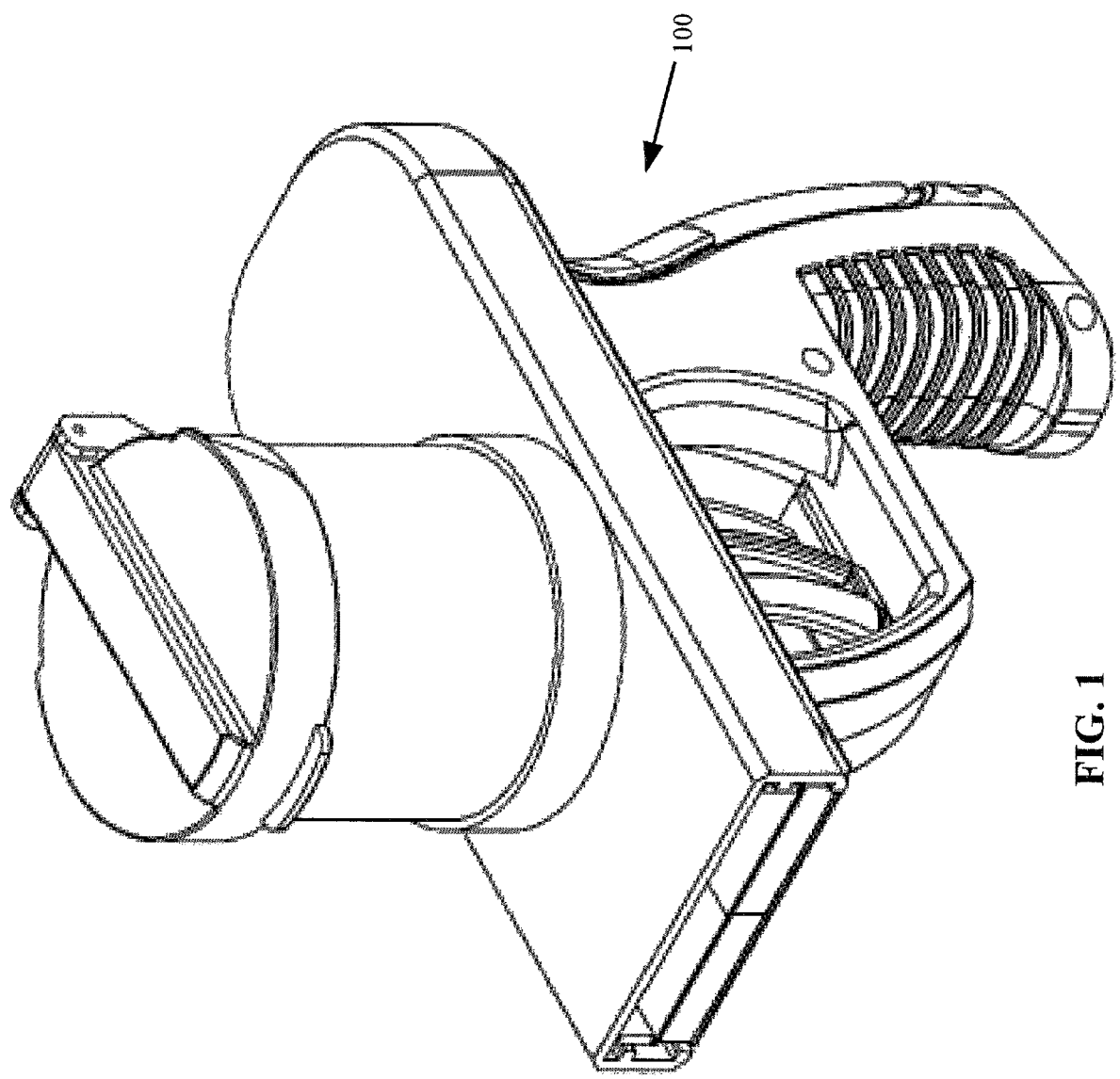
FIG. 1 is a front perspective view of the pet treat launching device disclosed herein.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission regarding a determination as to its availability as prior art with respect to the herein disclosed and claimed apparatus.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder%20Upgrade/fittolerences%20%5BRead-Only%5D.pdf.

It is also noted that any use herein of relative terms such as "top," "bottom," "upper," "lower," "vertical," and "horizontal" are merely intended to be descriptive for the reader, and may be based on the depiction of those features within the figures for one particular position of the apparatus.

FIGS. 1-32 show various views of a pet treat launching device 100. As seen in FIGS. 10-11, the pet treat launching device 100 may be formed of a launcher assembly 101, and a cover assembly 102.

The launcher assembly 101 may be formed of: a housing, which may be split into a left side housing 110L and a right side housing 110R; a first spring 130; a second spring 140; a trigger 150; and a treat launch member 160.

Figure 1A:
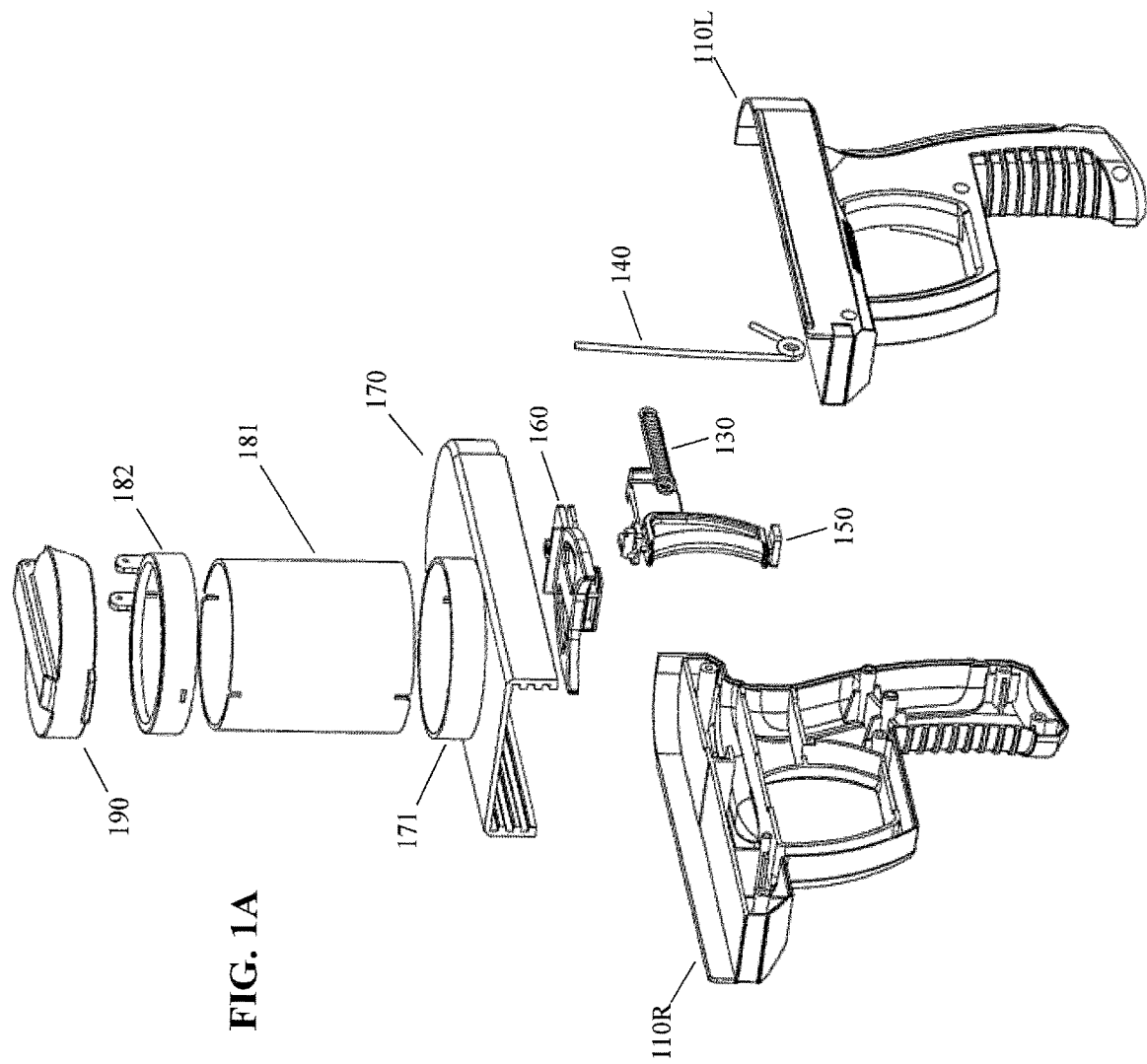
FIG. 1A is an exploded view of the component parts of the pet treat launching device of FIG 1.
Figure 1B:
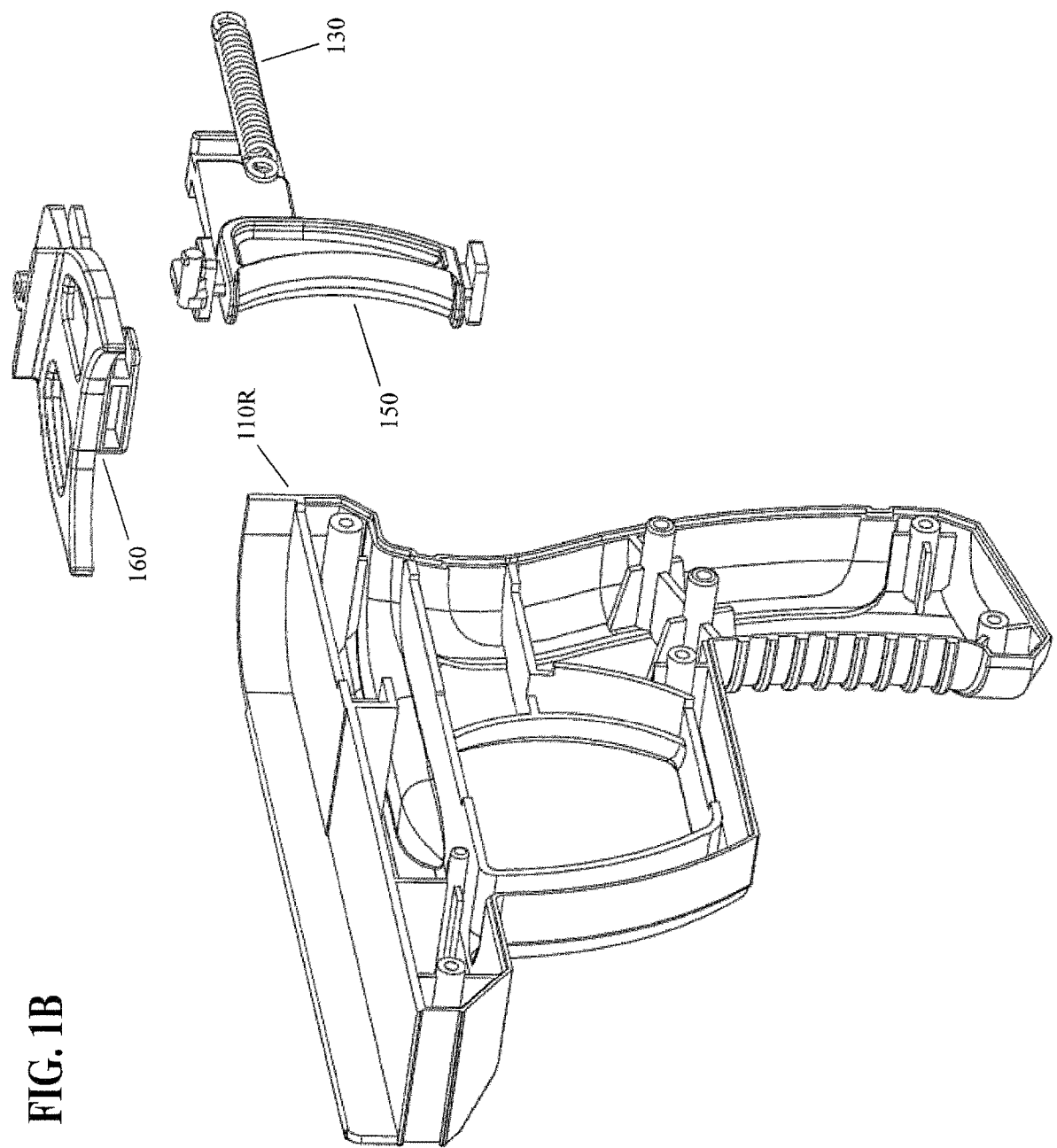
FIG. 1B shows the rights side housing, the trigger, the treat launch member, and the helical spring of the exploded view of FIG. 1A, but are shown enlarged.
Figure 15:
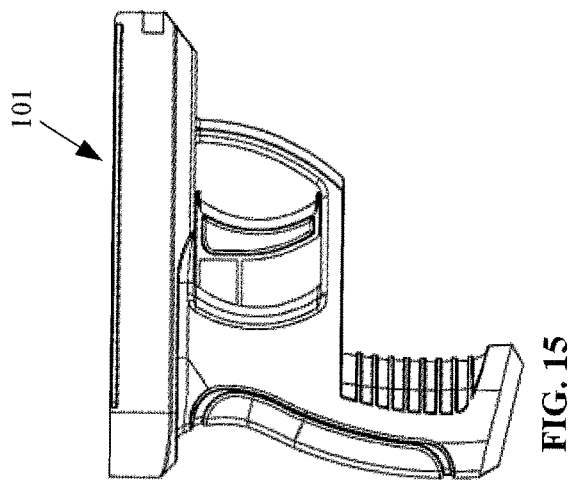
FIG. 15 is the side view of FIG. 15, but shown after the cover assembly has been removed.
Figure 14:
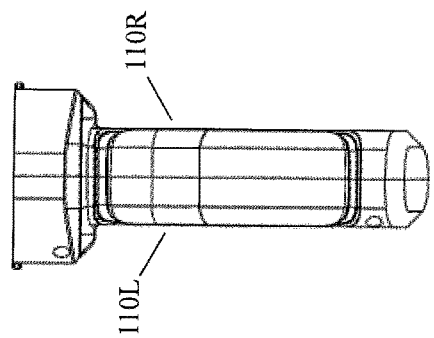
FIG. 14 is a rear view of FIG. 4, but shown after the cover assembly has been removed.
Figure 16:
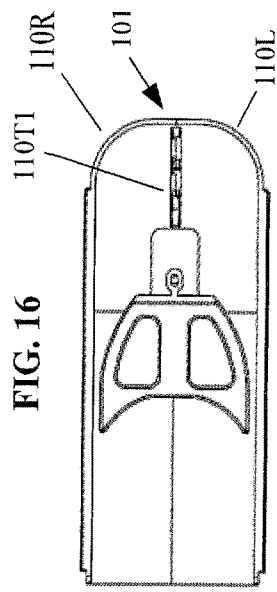
FIG. 16 is the top view of FIG. 6, but shown after the cover assembly has been removed.
Figure 12:
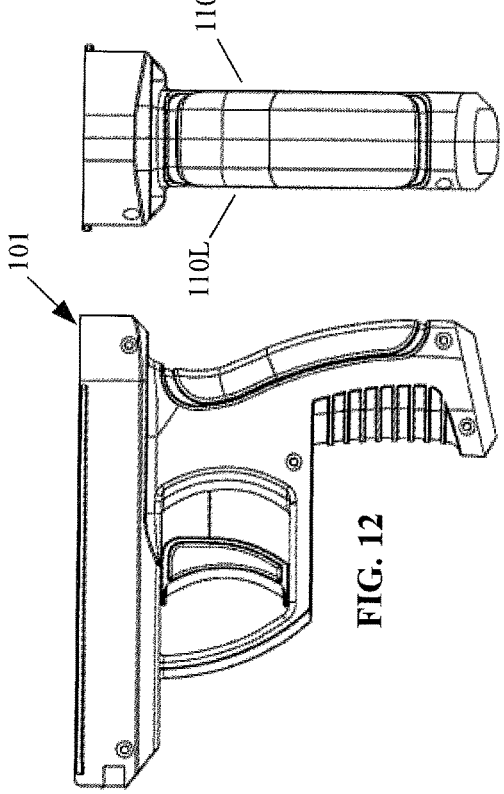
FIG. 12 is the side view of FIG. 2, but shown after the cover assembly has been removed.
Figure 13:
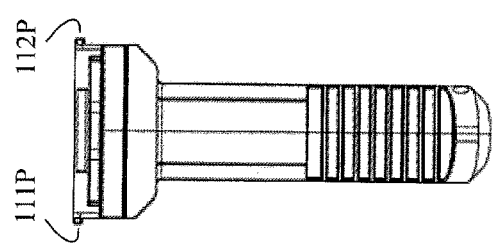
FIG. 13 is the front view of FIG. 3, but shown after the cover assembly has been removed.
Figure 17:
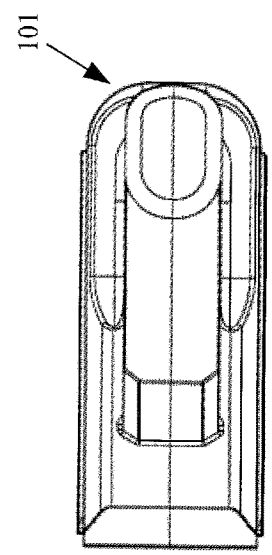
FIG. 17 is a bottom view of FIG. 7, but shown after the cover assembly has been removed.

The treat launch member 160 may be slidably coupled to the left side housing 110L, or to the right side housing 110R, or to both the left side housing 110L and right side housing 110R. As seen in FIG. 1B, a portion of the treat launch member may be formed to have an I-shaped cross-section, which may slide in a gap between the two housing halves 110L/110R formed by a recess at the mating portion of each of the housing halves (i.e., track 110T1 which is visible in FIG. 10 and FIG. 16). The treat launch member 160 may thus be slidable between a first position, a second position, and a third position, i.e., between the launch position of FIG. 23, the cocked position shown in FIG. 26 (being just prior to disengagement of the second spring 140 from the trigger 150), and the release position shown in FIG. 29.

The trigger 150 may similarly be configured to slide in a single track formed with respect to the left side housing 110L, or the right side housing 110R, or both the left side housing 110L and the right housing 110R, or with respect to a single unitary housing. As may be seen in FIG. 1B, and FIG. 32, the trigger 150 may be formed with an I-shaped cross-section, so that the upper and lower portions of the I-shape may each respectively slide in an upper track 110TU and a lower track 110TL, which may be formed at the mating portion of each of the two housing halves 110L/110R. Use of the two tracks (110TU and 110TL) may provide greater stability and smoother sliding of the trigger in the housing.

The first spring 130, which may be a helical spring, may have a first end 131 secured to a portion of the housing proximate to its open end, from which the treat disk is launched, and may, as seen in the figures, be secured to the left side housing 110L. The second end 132 of the first spring 130 may be secured to a post 150P that protrudes from the trigger 150, as seen in FIG. 24. Therefore, the trigger 150 may thus be slidable between a first position, a second position, and a third position, i.e., between the launch position of FIGS. 23 and 24, the cocked position shown in FIGS. 27 and 28, and the release position of FIGS. 29 and 30. When the trigger 150 is in the launch position (see FIG. 23 and FIG. 24), and is subsequently squeezed by the user's finger (see e.g., FIG. 25), the applied force would oppose the biasing provided by the first spring 130, and if the user releases the force applied thereto by his/her finger, the trigger would automatically be reset back to the launch position by being biased thereto by the first spring 130.

The second spring 140 may have a first portion coupled to a portion of the housing and a second portion coupled to the treat launch member 160, to bias the treat launch member. As seen in FIG. 23, the second spring 140 may be coupled to a portion of the housing (e.g., the left side housing 110L) which may be within the handle region. In one embodiment, a pair of protrusions may be positioned close together, between which a leaf spring may be fixedly mounted in the handle region to be used as the second spring 140 (not shown), to bias the treat launch member 160. Alternatively, the second spring 140 may be formed as a torsion spring, as shown throughout the figures merely to be exemplary, and may have a plurality of windings 143 mounted to a post 111 on the housing, with a first arm 141 inhibited from movement by another housing member (e.g., post 112), and a second arm 142 that may have its distal end coupled to the treat launch member 160.

A portion of the trigger 150 may be configured to selectively engage with a portion of the second arm 142 of the second spring 140. As seen in FIG. 23, a portion of the trigger 150 may be formed to have a recess, creating a lip 151 and a protruding stop 152. With the plurality of windings 143 mounted to the post 111 on the housing, and the first arm 141 of the second spring 140 positioned against the stop 112, a force may need to be applied to the second aim 142 to seat it within the recess of the trigger 150 during assembly of the device, and upon releasing of that force, the second arm may be biased into contact with the recess (being retained in contact with the trigger by the lip 151) and may thus bias the treat launch member 160 toward the launch position and also redundantly bias the trigger toward the launch position.

Figure 30:
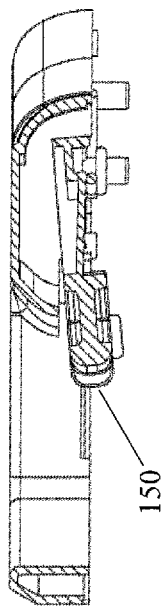
FIG. 30 is a cross-sectional view through the pet treat launching device shown in FIG. 29.
Figure 28:
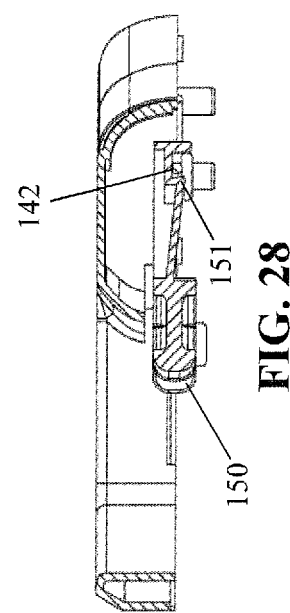
FIG. 28 is a cross-sectional view through the pet treat launching device shown in FIG. 27.
Figure 29:
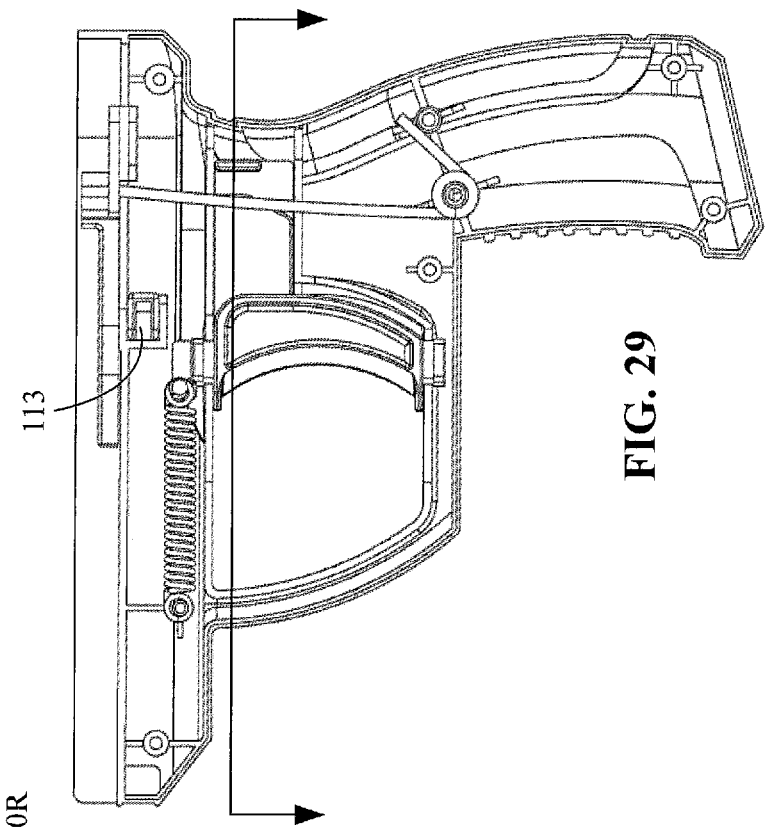
FIG. 29 is the side view of FIG. 27, but shown just after the trigger is moved further in the housing to release the arm of the torsion spring, permitting biased acceleration of the treat launch member.
Figure 27:
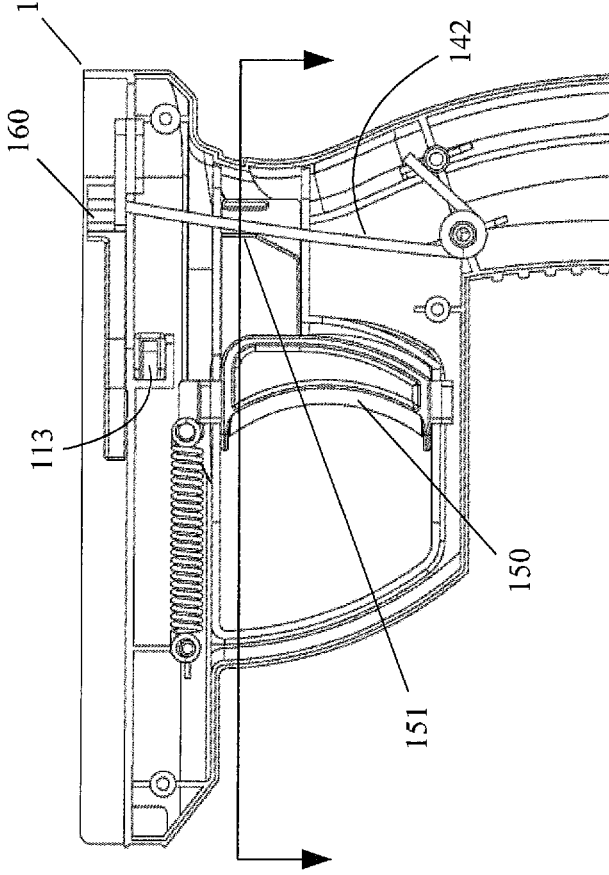
FIG. 27 is the side view of FIG. 25.
Figure 28A:
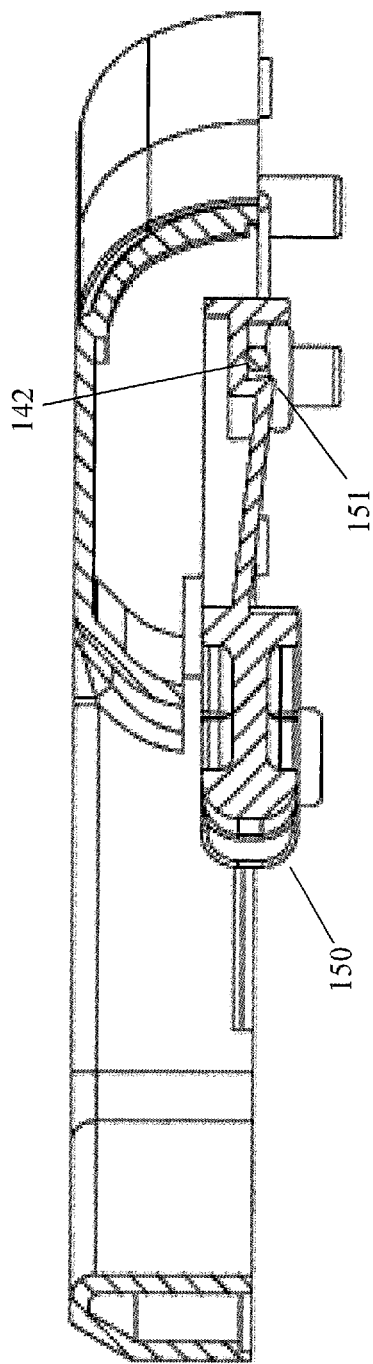
FIG. 28A is the view of FIG. 28 shown enlarged.
Figure 30A:
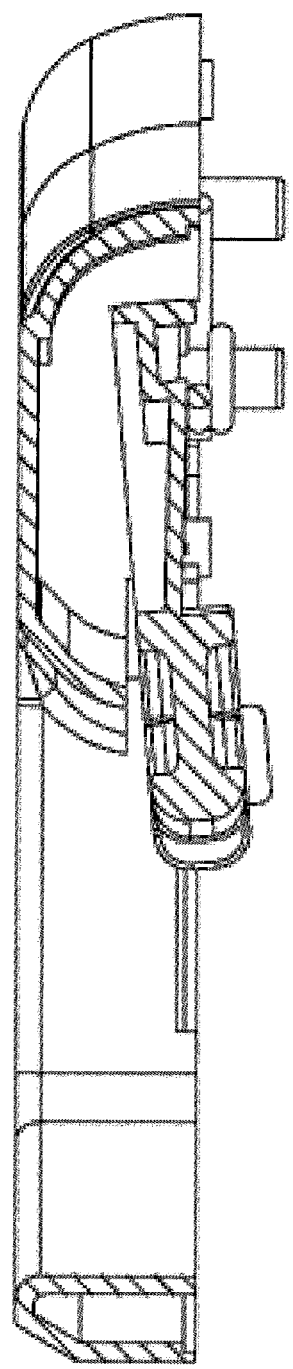
FIG. 30A is the view of FIG. 30 shown enlarged.
Figure 32:
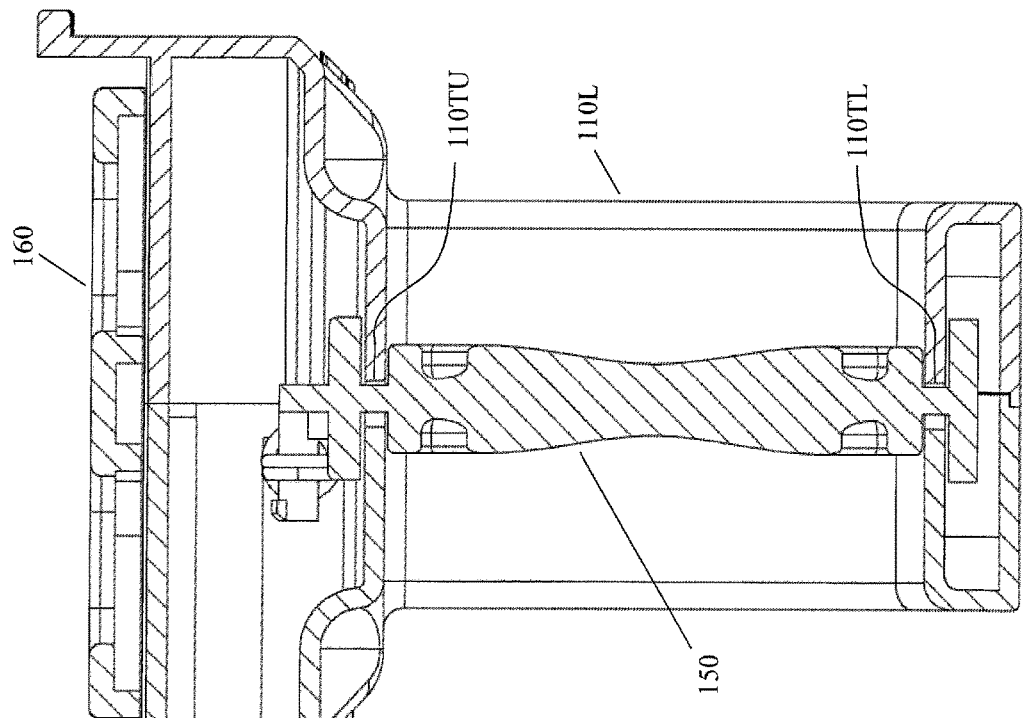
FIG. 32 is a cross-sectional view taken through the pet treat launching device shown in FIG. 31.
Figure 31:
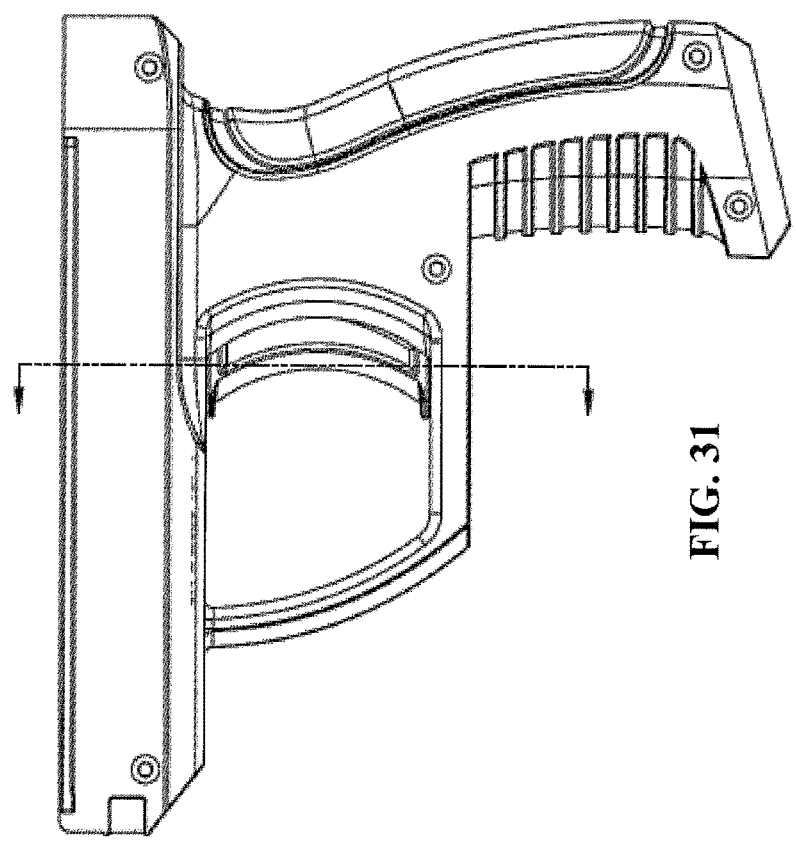
FIG. 31 is the side view of FIG. 12, shown enlarged.

As the trigger 150 is actuated to slide by a finger of the user, the force applied thereto may thus overcome the biasing of the first spring 130 and overcome the biasing provided by the second arm 141 of the second spring 140. As the trigger 150 is actuated by the user it moves in a first track portion in the housing being substantially parallel to the axial direction 101X of the device, and as the trigger approaches the cocked position (see FIG. 27 and the section cut of FIGS. 28 and 28A), the portion of the track in the housing followed by the trigger may then be at an acute angle to the axial direction, and is thereby configured to cause the trigger to also be angled with respect to the housing. Therefore, as seen in FIGS. 29, 30, and 30A, as the treat launch member 160 reaches the release position, the angled positioning of the trigger 150 causes the second arm 142 of the second spring 140 to become unseated (i.e., be dislodged) from the lip 151 formed by the recess in the trigger. Once the second arm 142 of the second spring 140 is dislodged from the lip 151, the second arm is free to slide relative to the trigger and thereby acts to bias the treat launch member 160, causing the treat launch member to accelerate toward the launch position to launch a pet treat (e.g., a treat 97, a treat 98, or a treat 99) which treat may be positioned against the opposite side of the treat launch member.

As the treat launch member 160 is biased to reach the launch position, movement of, and thus the biasing provided to the treat launch member by the second arm 142 of the second spring 140, may be terminated by contact of the second arm with a stop 113 on the housing (see FIG. 23). The stop 113 on the housing may be positioned to arrest the movement and biasing provided by the second arm 142 of the second spring 140 just before the treat launch member 160 reaches the launch position, so as not to cause an impact load upon the housing greater than what occurs just from the treat launch member being stopped abruptly.

The cover assembly 102, as seen in FIG. 10 and FIG. 11, may include an upper cover member 170, and a treat storage member 180 that is configured to house a plurality of treats stacked one upon the other, which storage member may be in the shape of a cylinder to receive a stacked plurality of disk-shaped treats. The treat storage cylinder 180 may be fixedly secured to the top of the cover member 170 in one embodiment (e.g., using fasteners or adhesive or both), or may be integrally formed therewith in another embodiment. A treat cover 190 may be used to seal the treats within the storage member 180, and may, in one embodiment, snap onto the storage member. In yet another embodiment, as may be seen in FIG. 1A, the cover member 170 may have a mounting ring 171 integrally formed therewith, and a cylinder 181 that may be fixedly secured to the mounting ring 171. A support ring 182 may be fixedly secured to the end of cylinder 181, to support the pivotal mounting of the cover member 190 thereto.

As may be seen in FIG. 8, an upper portion of the housing may be formed to include an elongated channel section, having a flat top wall member 114, a first side wall member 115, and a second side wall member 116, which first and second side wall members may be perpendicular to the top wall member. As may be seen in FIG. 1A and FIG. 8, the cover member 170 of the cover assembly 102 may also include a channel section formed of a flat top wall member 171, a first side wall member 172, and a second side wall member 172. In one embodiment, the channel section of the housing may be fixedly secured to the channel section of the cover member 170 in any suitable manner (e.g., using adhesive). In another embodiment, the channel section of the cover member 170 may be configured to slidably and releasably engage with the channel section of the housing, to form a treat launch chamber shaped to direct the pet treat in the axial direction.

Since different sized pet treats may preferably be used to entice different sized pets to exercise (e.g., a small size treat for smaller dogs and a large size treat for larger dogs), the pet treat launching device 100, as seen in FIG. 21, may be particularly configured to accommodate reliable launching of disks having a different thickness (e.g., small, medium, and large). The pet treat launching device 100 may also be configured to quickly switch between launching of various disk-shaped pet treats with different thicknesses. To accommodate receiving of the particular thickness disk within the treat launch chamber formed by the channel section of the cover member 170 and the channel section of the housing, the cover member may be formed with a plurality of spaced apart grooves, e.g., grooves 181, 182, and 183 (see FIG. 10), any one of which may be used to couple the cover member to a corresponding protrusion or protrusions on the housing, e.g., protrusions 111P and 112P (see FIG. 13).

As seen in FIG. 18 and FIG. 18A, when the groove(s) 181 of the cover member 170 is coupled to the protrusions 111P and 112P of the housing, a small height treat disk may be accommodated, and may be gravity fed into the chamber (e.g., the treat disks 97 shown in FIG. 21). (Note that groove 181 may be a single groove that goes all the way around the cover member 170, or alternatively, two separate groove may be formed).

Figure 19:
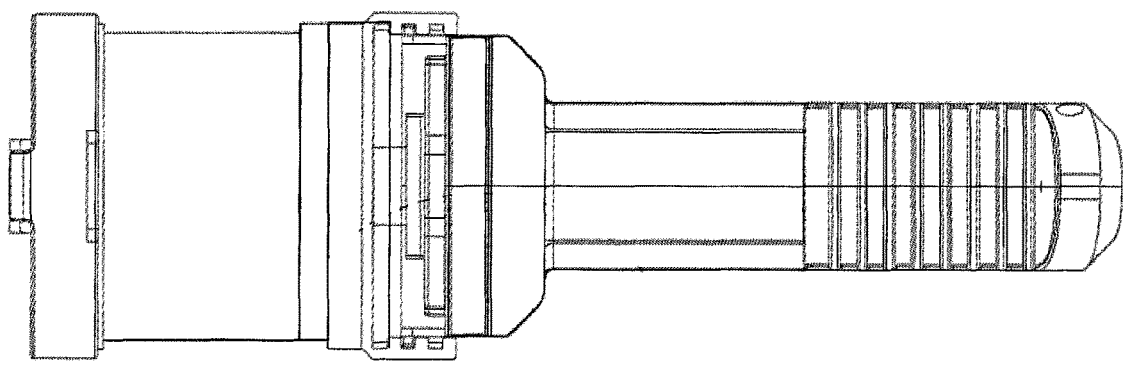
FIG. 19 is the front view of FIG. 3 shown enlarged, and also shown with the flanges of the housing received in the middle track of the cover member to facilitate launching of the medium thickness pet treat disks.
Figure 19A:
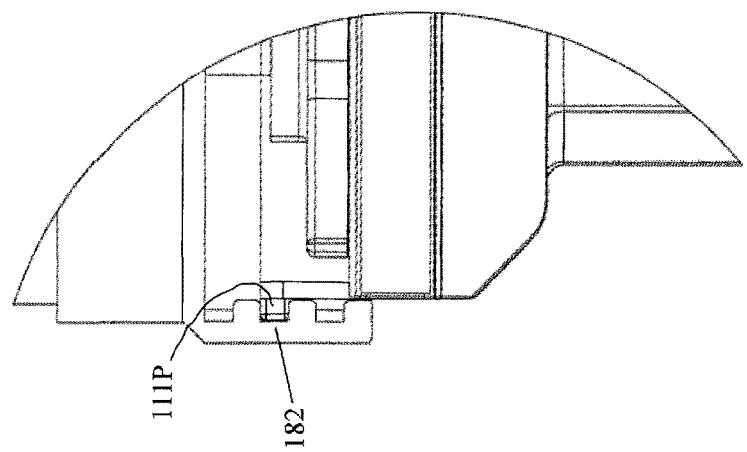
FIG. 19A is an enlarged detail view of the middle track of the cover member and the housing flanges, as shown in FIG. 19.

As seen in FIG. 19 and FIG. 19A, when the groove(s) 182 of the cover member 170 is coupled to the protrusions 111P and 112P of the housing, a medium height treat disk may be accommodated in the chamber (e.g., the treat disks 98 shown in FIG. 21).

Figure 20:
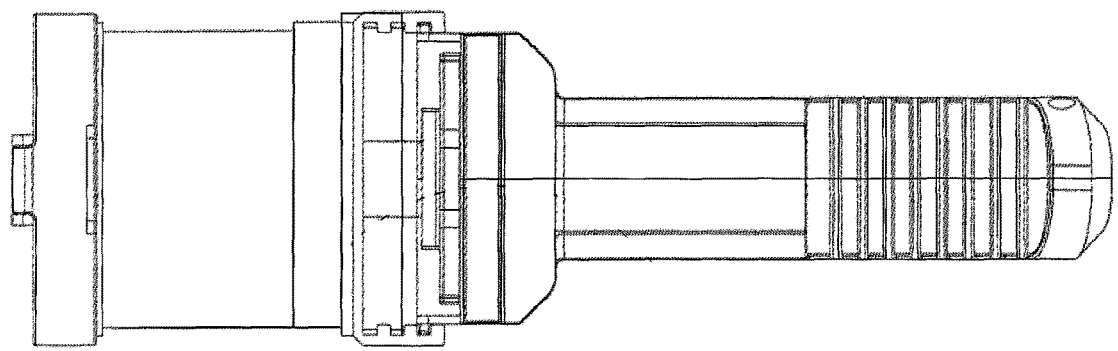
FIG. 20 is the front view of FIG. 3 shown enlarged, and also shown with the flanges of the housing received in the lower track of the cover member to facilitate launching of the thickest treat disks.
Figure 20A:
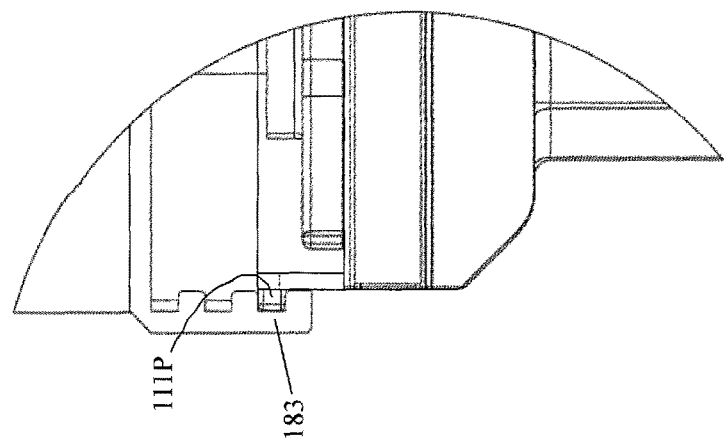
FIG. 20A is an enlarged detail view of the lower track of the cover member and the housing flanges, as shown in FIG. 20.
Figure 22A:
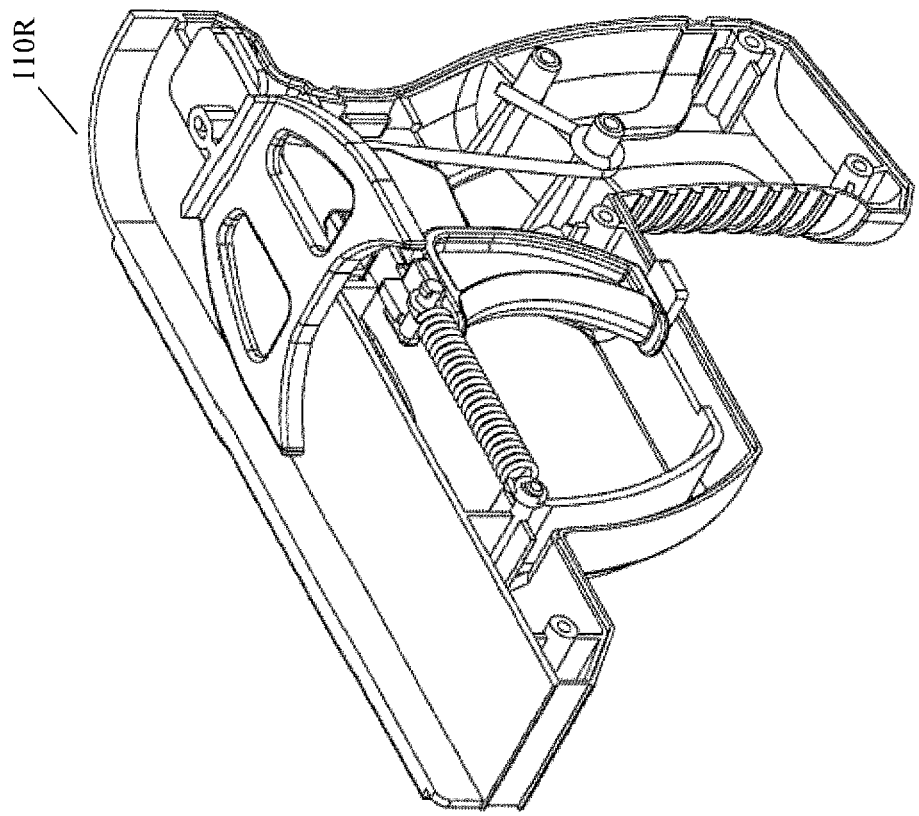
FIG. 22A is the perspective view of FIG. 22, but shown after the trigger has been drawn back as far as possible before the arm of the torsion spring is released to permit biased acceleration of the treat launch member.
Figure 22:
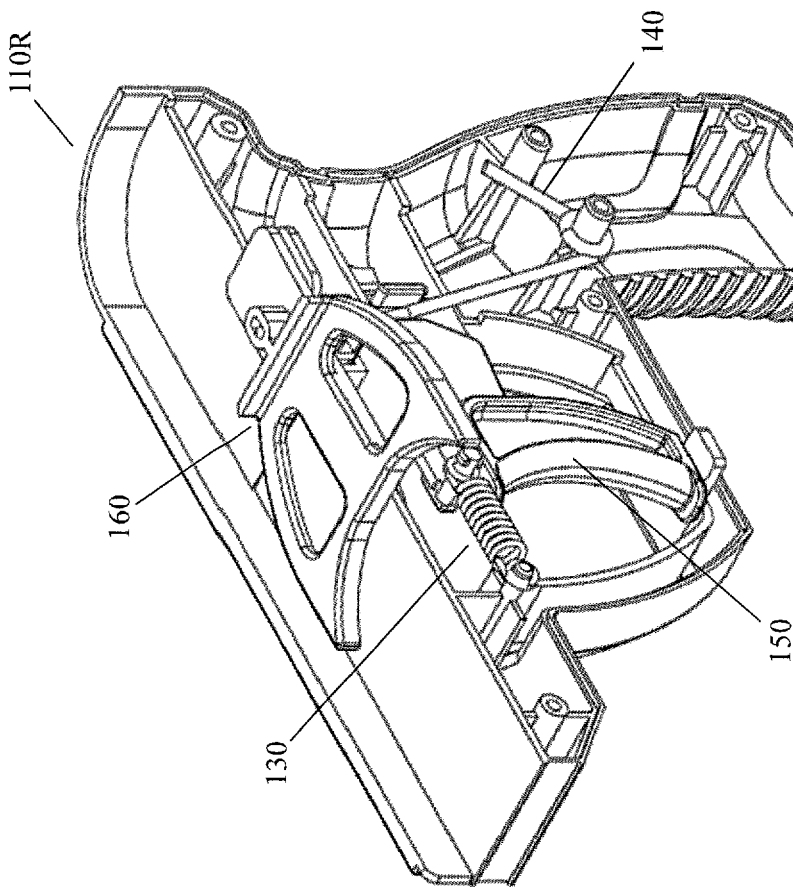
FIG. 22 is the perspective view of the pet treat launching device of FIG. 1, but shown after the cover assembly has been removed, and also shown after the left-side housing portion has been removed to expose interior parts of the pet treat launching device.

As seen in FIG. 20 and FIG. 20A, when the groove(s) 183 of the cover member 170 is coupled to the protrusions 111P and 112P of the housing, a larger height treat disk may be accommodated in the chamber (e.g., the treat disks 99 shown in FIG. 21).

The interior surface of the treat launch chamber, being formed by the channel section of the cover member 170 and the channel section of the housing, is preferably close in size to the treat disk being launched (i.e., providing a small clearance fit for the disk). Being so formed, each of the different sized treat disks (97, 98, 99) is relatively confined in the treat chamber, and tends to only accelerate in a straight line and undergo rectilinear motion, and does not experience curvilinear motion which may cause the treat disk to become jammed in the chamber, and/or possibly disintegrate, and/or not be launched as far.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A pet treat launching device comprising:
    a launcher assembly, said launcher assembly comprising:
        a housing, said housing having a first end and a second end, a portion of said housing being open in proximity to said second end;
        a trigger, said trigger configured to move with respect to said housing between a first trigger position and a second trigger position;
        a first spring, said first spring configured to bias said trigger towards said first trigger position;
        a treat launch member, said treat launch member slidably coupled to said housing, being slidable between at least a launch position and a release position; and
        a second spring, said second spring configured to bias said treat launch member to slide towards said open end of said housing;
    a cover assembly, said cover assembly comprising:
        a cover member; and
        a treat storage member, said treat storage member configured to slidably receive a stacked plurality of pet treats;
    wherein said cover member comprises a plurality of spaced apart grooves;
    wherein said housing comprises a protrusion; and
    wherein said protrusion of said housing is configured to be slidably received within any one of said plurality of spaced apart grooves of said cover member to accommodate launch of a corresponding plurality of different treat thicknesses.

2. The pet treat launching device according to claim 1, wherein said trigger is configured to releasably engage with said second spring when said trigger is biased into said first trigger position;
    wherein said second spring is further configured to disengage from said trigger after said trigger is actuated into said second trigger position; and
    wherein trigger drives said second spring and said treat launch member into said release position as said trigger reaches said second trigger position, to cause said biased treat launch member to accelerate toward said launch position to launch one pet treat.

3. The pet treat launching device according to claim 2, wherein said housing comprises a channel section;
    wherein said cover member comprises a channel section; and
    wherein said channel section of said cover member engages said channel section of said housing to form a treat launch chamber shaped to direct the pet treat out of said open end of said housing.

4. The pet treat launching device according to claim 3, wherein said housing comprises: a track formed in said channel section of said housing, said track having a first portion being linear and being oriented in an axial direction of said channel section of said housing, and a second portion being at an acute angle with respect to said axial direction of said channel section of said housing;
    wherein said trigger is configured to slide along said track; and
    wherein said trigger moves in said second portion of said track when said treat launch member reaches said release position, said trigger being thereby angled with respect to said axial direction of said channel section of said housing to cause said first spring to disengage from said trigger, and thereafter bias and accelerate said treat launch member towards said first end.

5. The pet treat launching device according to claim 1, wherein said cover assembly comprises a treat cover, said treat cover being pivotally coupled to said pet treat storage member.

6. The pet treat launching device according to claim 1, wherein said pet treat storage member comprises a hollow cylindrical member.

7. The pet treat launching device according to claim 1, wherein said first spring comprises a helical spring; and
wherein said second spring comprises a torsion spring.

8. A pet treat launching device comprising:
    a launcher assembly, said launcher assembly comprising:
        a housing, said housing having a first end and a second end, a portion of said housing being open in proximity to said second end;
        a trigger, said trigger configured to move with respect to said housing between a first trigger position and a second trigger position;

a first spring, said first spring configured to bias said trigger towards said first trigger position;

a treat launch member, said treat launch member slidably coupled to said housing, being slidable between at least a launch position and a release position; and a second spring, said second spring configured to bias said treat launch member to slide towards said open end of said housing;

a cover assembly, said cover assembly comprising:

a cover member; and a treat storage member, said treat storage member configured to slidably receive a stacked plurality of pet treats;

and means for slidably coupling said cover member to said housing at any of a plurality of different positions for accommodating launching of a corresponding plurality of different treat thicknesses.

9. The pet treat launching device according to claim 8, wherein said trigger is configured to releasably engage with said second spring when said trigger is biased into said first trigger position;

wherein said second spring is further configured to disengage from said trigger after said trigger is actuated into said second trigger position; and wherein trigger drives said second spring and said treat launch member into said release position as said trigger reaches said second trigger position, to cause said biased treat launch member to accelerate toward said launch position to launch one pet treat.

10. The pet treat launching device according to claim 9, wherein said housing comprises a channel section;

wherein said cover member comprises a channel section; and wherein said channel section of said cover member engages said channel section of said housing to form a treat launch chamber shaped to direct the pet treat out of said open end of said housing.

11. The pet treat launching device according to claim 10, wherein said housing comprises: a track formed in said channel section of said housing, said track having a first portion being linear and being oriented in an axial direction of said channel section of said housing, and a second portion being at an acute angle with respect to the axial direction of said channel section of said housing;

wherein said trigger is configured to slide along said track; and wherein said trigger moves in said second portion of said track when said treat launch member reaches said release position, said trigger being thereby angled with respect to said axial direction of said channel section of said housing to cause said first spring to disengage from said trigger, and thereafter bias and accelerate said treat launch member towards said first end.

12. The pet treat launching device according to claim 8, wherein said cover assembly comprises a treat cover, said treat cover being pivotally coupled to said pet treat storage member.

13. The pet treat launching device according to claim 8, wherein said pet treat storage member comprises a hollow cylindrical member.

14. The pet treat launching device according to claim 8, wherein said first spring comprises a helical spring; and wherein said second spring comprises a torsion spring.

* * * * *